United States Patent
Zhou

(10) Patent No.: US 8,562,036 B2
(45) Date of Patent: Oct. 22, 2013

(54) FIXING APPARATUS FOR BATTERY

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 373 days.

(21) Appl. No.: 12/979,299

(22) Filed: Dec. 27, 2010

(65) Prior Publication Data

US 2012/0146345 A1 Jun. 14, 2012

(30) Foreign Application Priority Data

Dec. 8, 2010 (CN) .......................... 2010 1 0579158

(51) Int. Cl.
*B65D 45/00* (2006.01)
*H05K 7/18* (2006.01)

(52) U.S. Cl.
USPC ............ 292/256; 361/801; 361/802; 429/96; 429/100

(58) Field of Classification Search
USPC ........ 429/9, 96, 100; 292/256, 19, 80, 81, 87, 292/89, 194, 198, 209, 210, 246, 249, 250, 292/256.6, 256.63, 256.69, 289, 290, 297, 292/298, 300, 303, 304, DIG. 11, DIG. 38, 292/DIG. 53, DIG. 63, 1, 95, 96, 101–103, 292/107, 108, 116, 117, 120, 195, 202–204, 292/299; 248/346.03, 637, 678, 689; 361/801–803, 807, 809, 810
See application file for complete search history.

(56) References Cited

U.S. PATENT DOCUMENTS

| | | | | |
|---|---|---|---|---|
| 4,959,199 A * | 9/1990 | Brewer | ................... | 422/300 |
| 5,943,218 A * | 8/1999 | Liu | ................... | 361/801 |
| 6,056,579 A * | 5/2000 | Richards et al. | ............. | 439/358 |
| 6,102,356 A * | 8/2000 | Huntley et al. | ............... | 248/500 |
| 6,381,148 B1 * | 4/2002 | Daskalakis et al. | ........... | 361/801 |
| 6,399,239 B2 * | 6/2002 | Bolstad et al. | ............... | 429/100 |
| 6,521,371 B1 * | 2/2003 | Lavanture | .................... | 429/100 |
| 6,608,765 B2 * | 8/2003 | Vier et al. | ..................... | 361/801 |
| 6,693,802 B2 * | 2/2004 | Vier et al. | ..................... | 361/801 |
| 6,738,261 B2 * | 5/2004 | Vier et al. | ..................... | 361/740 |
| 6,762,932 B2 * | 7/2004 | Regimbal et al. | ........ | 361/679.33 |
| 7,054,153 B2 * | 5/2006 | Lewis et al. | ............. | 361/679.33 |
| 7,110,251 B2 * | 9/2006 | Wu | .......................... | 361/679.32 |
| 7,510,796 B2 * | 3/2009 | Tokano | ........................... | 429/96 |
| 7,876,569 B2 * | 1/2011 | Xue | ............................ | 361/759 |
| 2003/0202334 A1 * | 10/2003 | Vier et al. | ..................... | 361/810 |
| 2003/0206406 A1 * | 11/2003 | Vier et al. | ..................... | 361/801 |
| 2006/0198115 A1 * | 9/2006 | Chen et al. | .................... | 361/796 |
| 2007/0030652 A1 * | 2/2007 | Chen | ............................ | 361/704 |
| 2008/0259582 A1 * | 10/2008 | Cheng et al. | ................. | 361/801 |

* cited by examiner

*Primary Examiner* — Carlos Lugo
*Assistant Examiner* — Alyson M Merlino
(74) *Attorney, Agent, or Firm* — Altis & Wispro Law Group, Inc.

(57) ABSTRACT

A fixing apparatus includes a base and a latch. A number of fixing holes is defined in the base for receiving supporting posts of different batteries. A first end of the latch is pivotably connected to a side of the base, and a second end opposite to the first end of the latch is detachably engaged with an opposite side of the base. A resilient tab extends downwards from a middle of the latch.

8 Claims, 4 Drawing Sheets

FIXING APPARATUS FOR BATTERY

BACKGROUND

1. Technical Field

The present disclosure relates to a fixing apparatus for batteries.

2. Description of Related Art

Generally, in an electronic device, such as a server, a redundant array of independent disk (RAID) cards is electrically connected to a battery, to protect cached data from being lost because of a power failure. However, different sized batteries need different fixing apparatus to be properly fixed in place, which is costly.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawing, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
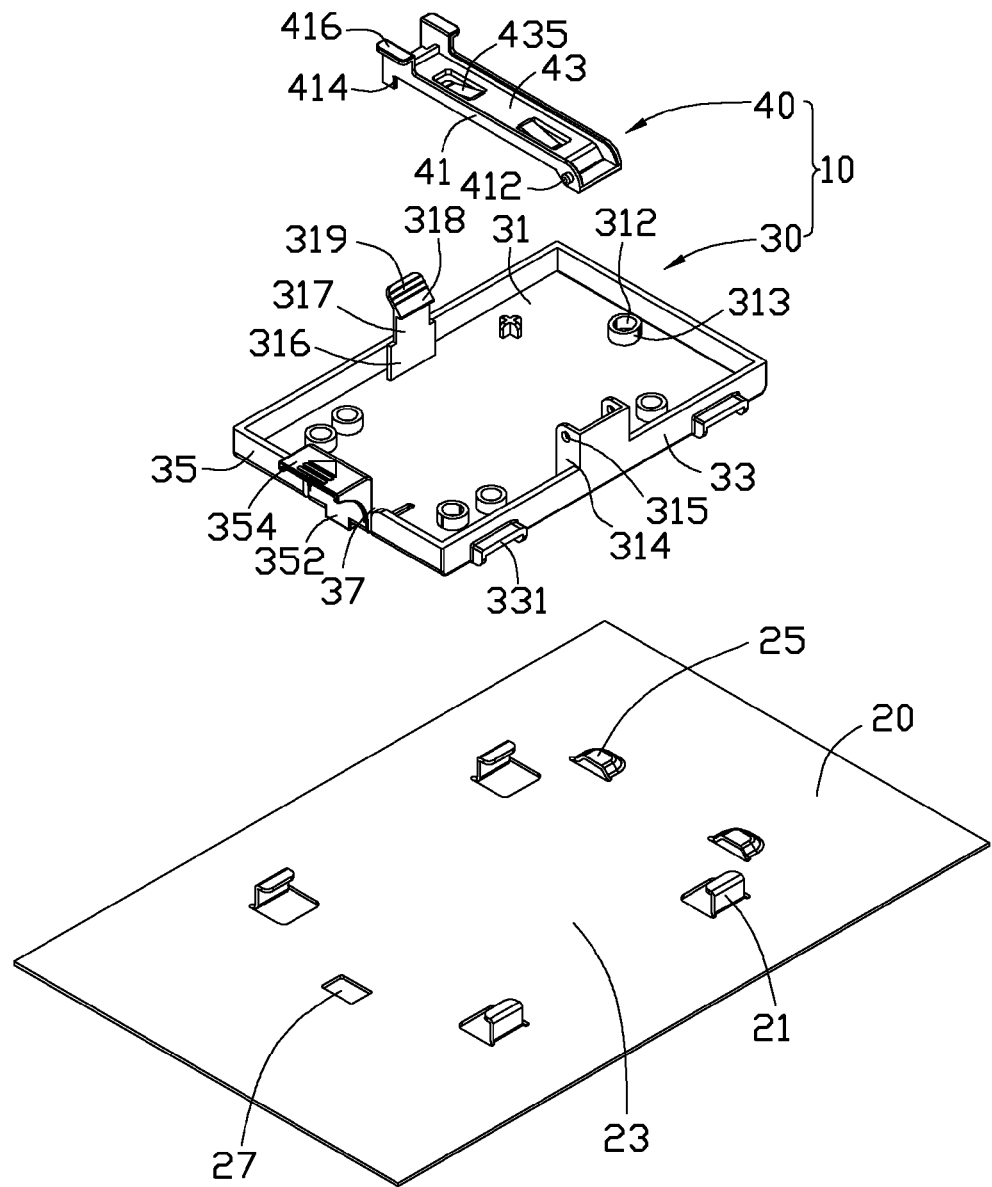
FIG. 1 is an exploded, isometric view of an embodiment of a fixing apparatus and a plate.

Referring to FIG. 1, an embodiment of a fixing apparatus 10 is provided to fix different sized batteries to a plate 20. The fixing apparatus 10 includes a base 30, and a latch 40.

The plate 20 forms two pairs of opposite hooks 21, and a receiving space 23 is bound by the pairs of hooks 21. Two stop portions 25 protrude from the plate 20 at an end of the receiving space 23 between the two pairs of hooks 21, and a hooking hole 27 is defined in the plate 20 at an opposite end of the receiving space 23.

The base 30 includes a rectangular bottom wall 31, two sidewalls 33 substantially perpendicularly extending up from opposite sides of the bottom wall 31, and two end walls 35 substantially perpendicularly extending up from opposite ends of the bottom wall 31. A plurality of posts 313 is formed on the bottom wall 31, corresponding to supporting posts of different batteries. A fixing hole 312 is defined in each post 313. Two protrusions 331 are formed on an outer surface of each sidewall 33. Two supporting plates 314 are formed on the bottom wall 31 adjacent to a middle of one of the sidewalls 33. The supporting plates 314 are substantially perpendicular to the sidewall 33. A pivot hole 315 is defined in each supporting plate 314. A stop plate 316 is formed on the bottom wall 31 adjacent to a middle of the other one of the sidewalls 33. The stop plate 316 is substantially parallel to the sidewalls 33. A hook 317 extends from a middle of a top of the stop plate 316. The hook 317 includes a hooking portion 318 protruding towards the interior of the base 30, and a slanted pressing portion 319 extending outwards from a top of the hooking portion 318. Two spaced slots 37 are defined in the bottom wall 31 adjacent to one of the end walls 35. The slots 37 substantially perpendicularly extend towards the end wall 35, and extend through a top of the end wall 35. A portion of the bottom wall 31 and the end wall 35 sandwiched between the slots 37 is resilient. A block 352 protrudes downwards from a bottom of the portion below the end wall 35, and an operating portion 354 extends upwards from a top of the portion.

The latch 40 includes two substantially parallel side plates 41, and a connecting plate 43 substantially perpendicularly connected between bottoms of the side plates 41. A pivot portion 412 extends outwards from each side plate 41 adjacent to a first end of the corresponding side plate 41. An abutting portion 414 protrudes downwards from a second end of each side plate 41 opposite to the first end. A substantially L-shaped handle 416 extends upwards and outwards from the second end of each side plate 41. Two spaced slanted resilient tabs 435 extend downwards from a middle of the connecting plate 43. Distal ends of the resilient tabs 435 which are separated from the connecting plate 43 are extended away from each other.

Figure 2:
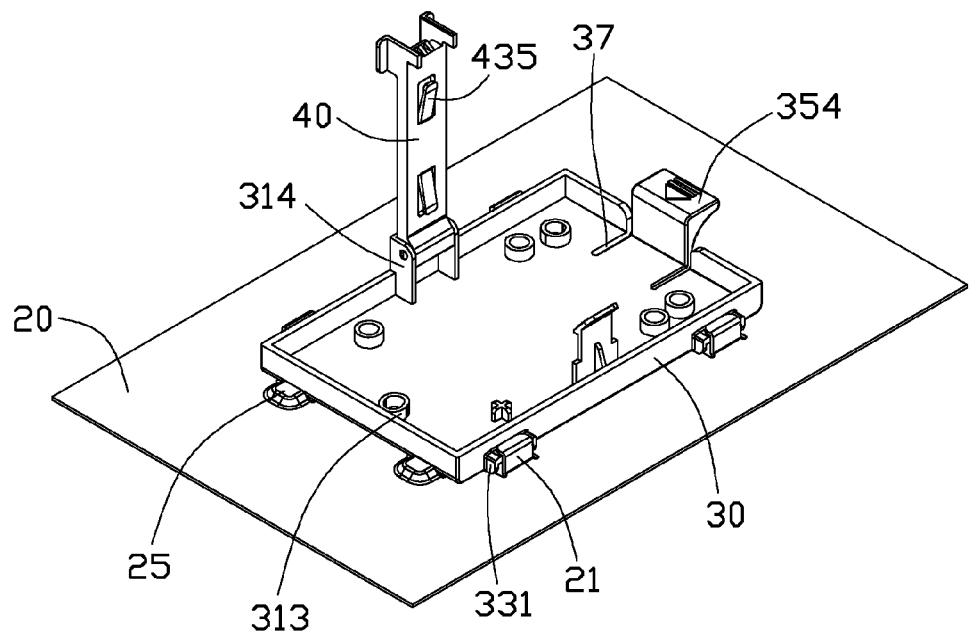
FIG. 2 is an assembled, isometric view of FIG. 1.

Referring to FIG. 2, in assembly, the pivot portions 412 of the latch 40 are engaged in the corresponding pivot holes 315 of the supporting plates 314. Thereby, the latch 40 is pivotably connected to the supporting plates 314, and the fixing apparatus 10 is assembled. The fixing apparatus 10 is inserted into the receiving space 23 of the plate 20 from an end away from the stop portions 25. The block 352 abuts against the plate 20, to deform the portion of the base 30 sandwiched between the slots 37 upwards. The fixing apparatus 10 is slid towards the stop portions 25, until the end wall 35 away from the operating portion 354 abuts against the stop portions 25. The protrusions 331 of the base 30 are engaged with the corresponding hooks 21 of the plate 20. The block 352 aligns with the hooking hole 27 of the plate 20. The portion of the base 30 sandwiched between the slots 37 is restored, to allow the block 352 to engage in the hooking hole 27. Thereby, the fixing apparatus 10 is mounted to the plate 20.

Figure 3:
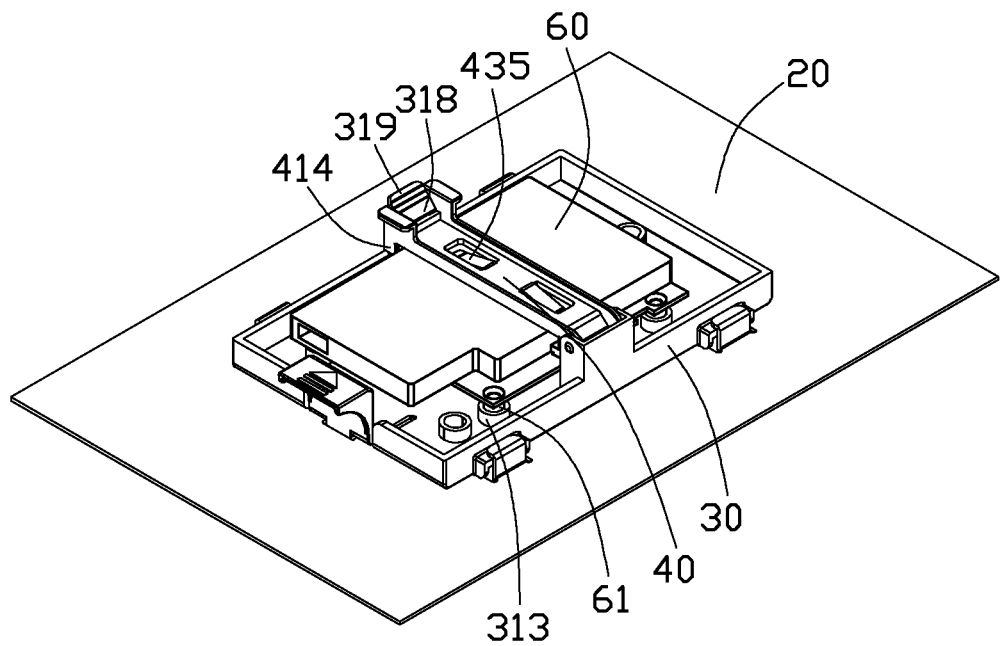
FIG. 3 is an assembled, isometric view of a first battery together with the fixing apparatus and the plate of FIG. 1.

Referring to FIG. 3, to fix a first battery 60 to the fixing apparatus 10, the first battery 60 is placed in the base 30, with supporting posts 61 of the first battery 60 engaging in the fixing holes 312 of the corresponding posts 313 of the base 30. The latch 40 is rotated towards the hook 317, to abut against and deform the hook 317 outwards. When the abutting portions 414 of the latch 40 abut against the top of the stop plate 316, the hook 317 is restored to allow the hooking portion 318 to engage with a top of the connecting plate 43 of the latch 40. Thereby, the latch 40 is locked to the base 30. The distal ends of the resilient tabs 435 abut against a top of the first battery 60, and tightly press the first battery 60 in the base 30.

To detach the first battery 60, the pressing portion 319 is pressed outwards, to allow the hooking portion 318 of the hook 317 to disengage from the latch 40. The handles 416 of the latch 40 are operated, to rotate the latch 40 away from the base 30. Thereby, the first battery 60 can be taken out from the base 30.

Figure 4:
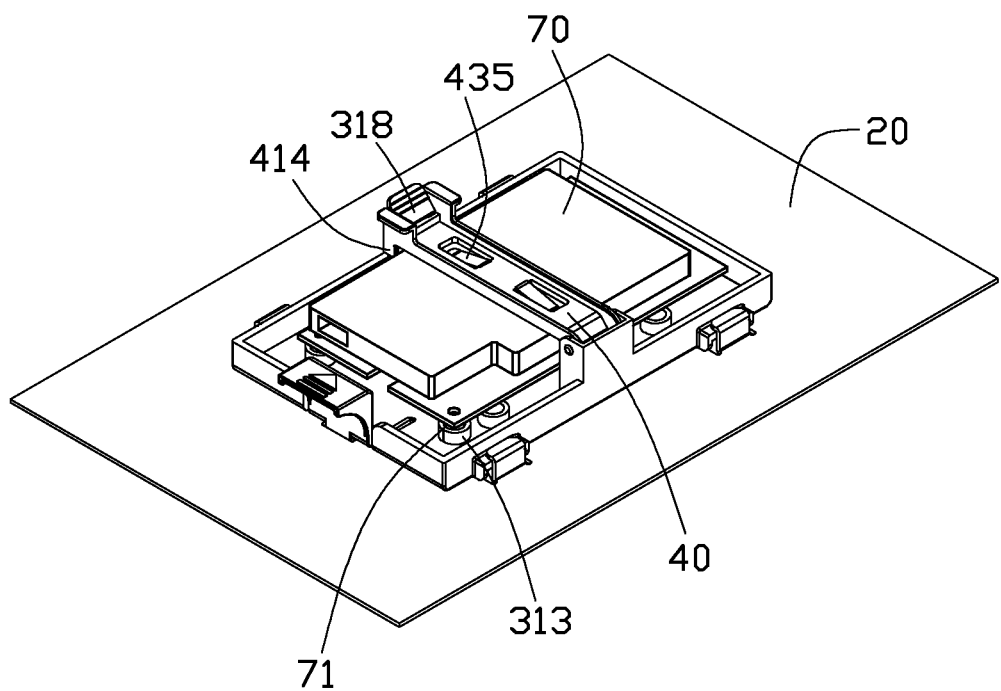
FIG. 4 is an assembled, isometric view of a second battery together with the fixing apparatus and the plate of FIG. 1.

Referring to FIG. 4, a second battery 70 having a different height than the first battery 60 is fixed to the fixing apparatus 10, with supporting posts 71 of the second battery 70 engaging in the fixing holes 312 of the corresponding posts 313 of the base 30, and the resilient tabs 435 of the latch 40 abutting against a top of the second battery 70. In other embodiments, different sized batteries can be tightly pressed in the base 30 by the resilient tabs 435.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A fixing apparatus, comprising:
a base defining a plurality of fixing holes for receiving supporting posts of different batteries; and
a latch, a first end of the latch pivotably connected to a side of the base, and a second end opposite to the first end of the latch detachably engaged with an opposite side of the base, at least one resilient tab extending downwards from a middle of the latch to abut one of the different batteries mounted in the fixing apparatus;
wherein the base comprises a rectangular bottom wall, two sidewalls substantially perpendicularly extending up from opposite sides of the bottom wall, and two end walls substantially perpendicularly extending up from opposite ends of the bottom wall; and
wherein two spaced slots are defined in the bottom wall adjacent to one of the end walls of the base, the slots substantially perpendicularly extend to said one of the end walls, and then extend through a top of said one of the end walls, a block protrudes downwards from a bottom of said one of the end walls between the slots, to releasably engage in a plate supporting the base.

2. The fixing apparatus of claim 1, wherein the at least one resilient tab comprises two resilient tabs, the latch comprises a connecting plate, the resilient tabs extend down from the connecting plate, with distal ends of the resilient tabs separated from the connecting plate and extending away from each other.

3. The fixing apparatus of claim 1, wherein two supporting plates are formed on the bottom wall adjacent to a middle of one of the sidewalls, the supporting plates are substantially perpendicular to the corresponding sidewall, a pivot hole is defined in each of the supporting plates, the latch comprises two side plates, and a connecting plate connected between the side plates, a pivot portion extends outwards from each of the side plates adjacent to a first end of the corresponding side plate, to engage in the pivot hole of the corresponding supporting plate.

4. The mounting apparatus of claim 3, wherein a stop plate is formed on the bottom wall adjacent to a middle of the other one of the sidewalls, the stop plate is substantially parallel to the sidewalls, a hook extends from a middle of a top of the stop plate, the hook comprises a hooking portion protruding towards the interior of the base, to engage with a top of the connecting plate, an abutting portion protrudes downwards from a second end of each of the side plates opposite to the first end, to abut against the top of the stop plate.

5. The fixing apparatus of claim 4, wherein the hook further comprises a slanted pressing portion extending outwards from a top of the hooking portion.

6. The fixing apparatus of claim 1, wherein a plurality of posts is formed on the bottom wall, each defining a fixing hole.

7. The fixing apparatus of claim 1, wherein an operating portion extends upwards from the top of said one of the end walls between the slots.

8. The fixing apparatus of claim 1, wherein a protrusion is formed on an outer surface of each of the sidewalls.

* * * * *